E. R. WILLIAMS.
LIQUID DISPENSING APPARATUS.
APPLICATION FILED APR. 17, 1912.
1,107,393.
Patented Aug. 18, 1914.
2 SHEETS—SHEET 1.
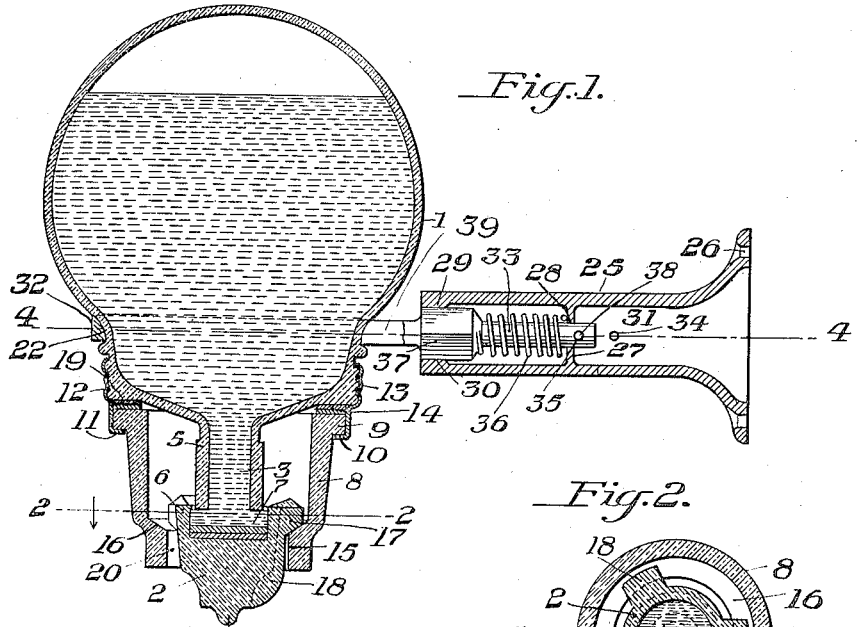
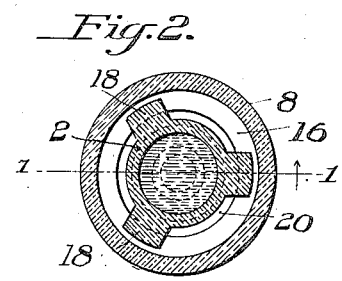
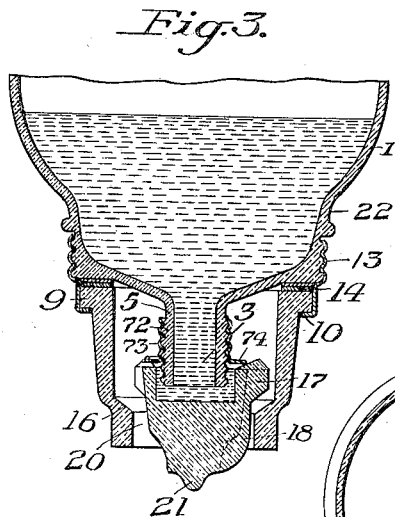
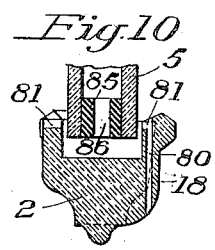
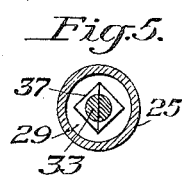
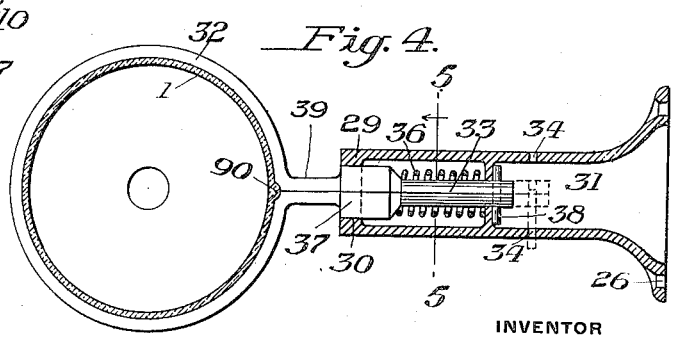
WITNESSES
INVENTOR
Edward R. Williams E. R. WILLIAMS.
LIQUID DISPENSING APPARATUS.
APPLICATION FILED APR. 17, 1912.
1,107,393.
Patented Aug. 18, 1914.
2 SHEETS—SHEET 2.
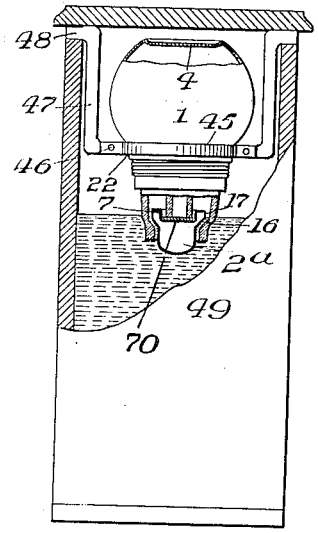
Fig. 6.
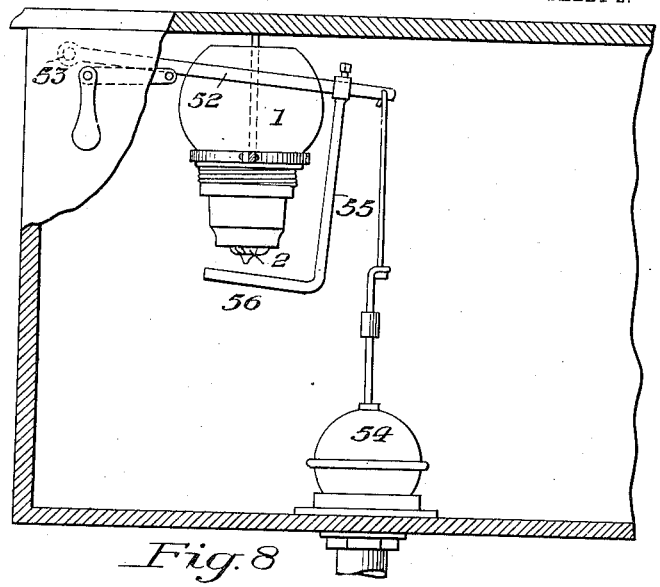
Fig. 8.
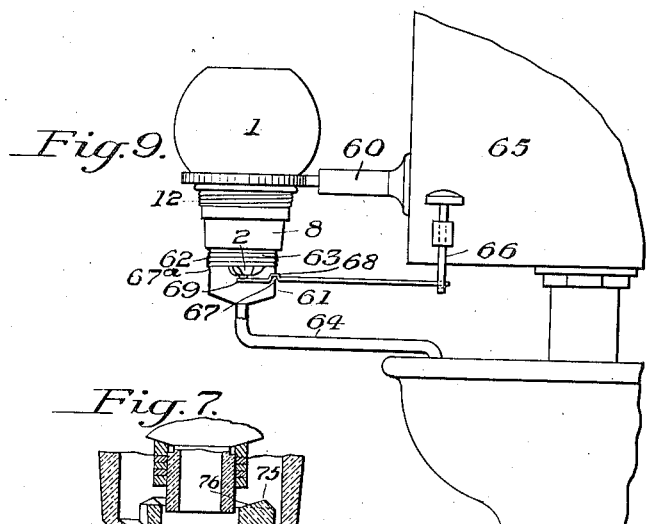
Fig. 9.
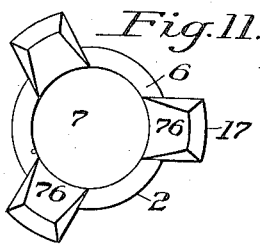
Fig. 11.
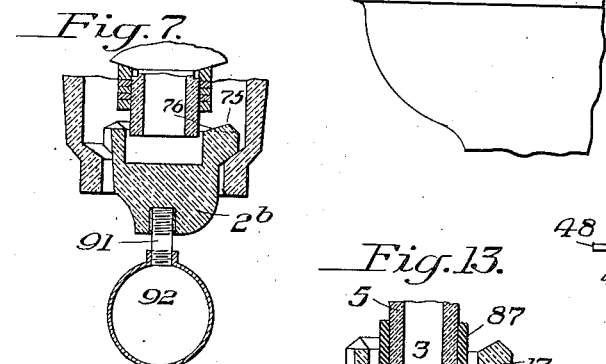
Fig. 7.
Fig. 13.
Fig. 12.
WITNESSES
INVENTOR
Edward R. Williams
By Fredk W Mules
Attorney

UNITED STATES PATENT OFFICE.

EDWARD R. WILLIAMS, OF SHARPSBURG, PENNSYLVANIA.

LIQUID-DISPENSING APPARATUS.

1,107,393.

Specification of Letters Patent. Patented Aug. 18, 1914.

Application filed April 17, 1912. Serial No. 691,297.

*To all whom it may concern:*

Be it known that I, EDWARD R. WILLIAMS, a resident of Sharpsburg, in the county of Allegheny and State of Pennsylvania, have invented a new and useful Improvement in Liquid-Dispensing Apparatus, of which the following is a specification.

This invention relates to devices for dispensing liquids, and more especially for dispensing exactly measured quantities of such liquids as liquid soap, toilet waters, perfumes, disinfectants, deodorants, etc.

The object of the invention is to provide a new and improved construction and arrangement of dispensing device which is simple, sanitary and inexpensive, and positive and reliable in operation, and which is adapted for either manual or automatic control.

Briefly stated, the invention comprises a receptacle arranged to discharge its contents through an orifice at or near its bottom into a cup, one of these parts preferably being fixed and the other movable, relative movement therebetween causing displacement of liquid contained in the cup and discharge thereof from the apparatus.

In the drawings, Figure 1 represents a sectional elevation on the line 1—1, Fig. 2, through a device constructed according to my invention; Fig. 2 is a horizontal section through the same on the line 2—2, Fig. 1; Fig. 3 is a detail view, corresponding to Fig. 1, and showing modifications, the cup being shown in a different position; Fig. 4 is a horizontal section on the line 4—4, Fig. 1, and illustrating the holding bracket; Fig. 5 is a cross section on the line 5—5, Fig. 4; Fig. 6 is a diagrammatic view, partly in cross section and showing the invention applied to a flushing tank; Fig. 7 is a detail cross sectional view of another form of the invention; Fig. 8 is a view corresponding to Fig. 6, and showing another application of the invention; Fig. 9 is an elevation illustrating another arrangement of the invention; Fig. 10 is a detail cross section, showing modifications; Fig. 11 is a top plan of the cup shown in Fig. 1; Fig. 12 is a detail view showing the supporting bracket used with the device of Fig. 6; and Fig. 13 is a detail view showing modifications.

As stated, my improved liquid dispenser is adapted for dispensing liquids of widely varying character, as for example, soaps, toilet waters, disinfectants or deodorants. In its simplest form, the invention comprises a receptacle 1 with which coöperates a cup 2, into which the liquid held in the receptacle 1 is discharged through its orifice 3. The receptacle 1 may be of any desired shape or form and constructed of any preferred material, as glass, porcelain, metal, or the like, and transparent or not, as desired. It may have straight sides or walls and either a flat or round top. As illustrated, it is formed of glass and is approximately spherical in shape. The receptacle is illustrated in Fig. 1 in what may be termed normal or operative position. Its upper portion may be round and a continuation of the main body of the receptacle, as shown in Fig. 1, or, as shown in Fig. 6, may be flattened, as at 4, to provide a base upon which the receptacle may rest when removed from the apparatus and inverted. The flat base 4 may be formed as a removable closure, screwed or otherwise secured to the receptacle but preferably, and as shown, is an integral portion thereof. At its lower portion, the receptacle is formed with a preferably integral neck 5, of general cylindrical form, and in which is formed the discharge orifice 3 referred to.

The body of cup 2 may be made of any material, but preferably of the same material as the receptacle 1, and in the present instance is made of a single solid piece of glass of cup shape, having an upwardly extending wall or rim 6 forming an interior well or depression 7. The wall 6 of the cup 2 surrounds the end of the neck 5 of the receptacle, which dips into the well or depression 7 therein, or in other words, extends below the upper edge or surface of the wall 6. Because of this construction, liquid contained in the receptacle 1 is prevented from continuously flowing therefrom by the liquid within the well forming a seal for the orifice 3 and preventing the entrance of air to the receptacle 1.

The receptacle 1 and the cup 2 are arranged to be movable relatively to each other. This relative movement may be accomplished in various ways. Either both of the members may be movable, or either may be fixed and the other movable. In the present construction, the receptacle 1 is fixedly mounted and the cup 2 is movable. The receptacle 1 is secured in a bracket illustrated in Figs. 1 and 4 and hereinafter described more in detail. The cup 2 may be supported in various ways. It is preferred, however, to support it from the receptacle itself and for this purpose a holder or support 8 is provided. This may be constructed of sanitary material as, for example, glass, porcelain or the like, and is preferably of annular or cylindrical shape, and provided at its upper end with a flange 9 having a shoulder 10 which is embraced by an inwardly turned flange 11 on preferably a metallic collar 12, which is of cylindrical form and threaded, as at 13, upon the receptacle 1. Preferably, one or more washers 14, formed of rubber, leather or like yielding material, are inserted between the holder 8 and an annular flat surface or shoulder 19 of the receptacle to protect the glass surfaces and provide a regulating means, as hereinafter more fully set forth. The lower end of the holder or support 8 is formed with a reduced portion having an annular wall 15 to provide a shoulder 16 upon which rest one or more lugs or projections 17 formed upon the cup 2, three such lugs being illustrated. As shown in Fig. 2, the projections 17 are comparatively narrow and are spaced circumferentially around the cup. In line with and under the projections 17 are ribs or guides 18, extending from the projections to the bottom of the cup, and the outer faces of which engage the inner wall 15 of holder 8 to guide the cup during its movement. It will be observed that the body of the cup is round and of less diameter than the internal diameter of the holder across the wall 15. This provides spaces 20 between the cup 2 and the holder 8 through which the liquid discharged from the well flows from the apparatus. Obviously, the lugs 17 normally, or when the apparatus is in operative condition, prevent removal of the well from the apparatus.

In use of the device, the receptacle is filled with liquid while inverted from the position shown in Fig. 1, and the cup 2 is then placed over the neck 5 thereof. The holder 8 is placed in position and tightly secured to the receptacle by screwing down the collar 12 to compress washers 14. The device is then inverted and securely supported in the position shown in Fig. 1. Normally, the cup 2 is supported with the lugs or projections 17 resting upon the shoulders 16 of holder 8. In this position of the parts, the upper edge of the wall of the cup is above the lower end of the neck 5. Liquid flows from the orifice 3 into the well in the cup 2 until the well is filled to approximately the level of the end of neck 5 or slightly thereabove. A liquid seal is thus formed at the orifice 3 preventing entrance of air to the receptacle, hence no more liquid can be discharged. When it is desired to discharge liquid from the apparatus, the cup 2 is moved upwardly to the position shown in Fig. 3. It will be observed that the well is of some depth and permits the entrance of the neck 5 of the receptacle thereinto as the cup is raised. Upon lifting of the cup, the neck 5 displaces a definite quantity of liquid therefrom, which flows over the upper edge of the wall 6 of the cup and down the outside surface thereof between the lugs 17 and ribs 18. The lower portion of the cup is curved, as shown, and projects from the holder 8 and is provided with a slight knob or protuberance 21. The liquid flowing down the outside of the cup collects at the protuberance 21 and drips therefrom. When sufficient liquid has been discharged from the container, or when the cup 2 has been raised to its full extent, it is allowed to drop to its lowest position, Fig. 1. This lowers the level of the liquid within the chamber and permits air to enter between the wall 6 of the cup and the outer surface of the neck 5 of the receptacle and through the orifice 3 thereof into the receptacle. In other words, as the cup 2 lowers to its normal position, air enters the receptacle 1 and liquid is discharged therefrom until the liquid seal is reestablished within the well. Each full movement of the cup results in the discharge of exactly the same quantity of liquid, and the discharge may be made as rapid and occur as often as desired.

To support the receptacle 1, any suitable form of holder or bracket may be provided. In the present instance, it is desirable to support the receptacle in such manner that it may be easily reversed in position for filling, and locked to prevent unauthorized removal thereof from the bracket.

Fig. 4 illustrates the construction of my improved holding bracket. This comprises a base 25 formed as a tubular member having a bore 31, and one end of which is expanded and provided with screw holes 26 or other means for attaching it to a wall or any suitable support. Between its ends, the body 25 is provided with a transverse wall 27, having an aperture 28 therethrough. At or near its other end, the body is provided with a head or wall 29, preferably formed integral with the body and having a square or otherwise suitably shaped aperture 30 therethrough. The bore 31 is circular in cross section and of a diameter at least as great as the greatest distance diametrically across the aperture 30. The receptacle 1 is supported in a ring or collar 32 seated in a groove or depression 22 in the receptacle, and to which is connected a shaft or rod 33 which is held within the bore of body 25. The rod 33 may be a single member but preferably is split, as shown, to provide a pair of arms lying side by side, which may be sprung apart to enable the ring to be clasped around the receptacle. Suitable means is provided between the ring 32 and the receptacle to prevent rotation of the receptacle in the ring, as for example, a knob or projection 90, formed integral with the material of the receptacle, and engaging a socket in the ring and formed in the arms of the rod 33. The end portion of the rod 33 is circular in cross section and of a diameter slightly less than the aperture 28 through which it extends and is movable. Between its end and ring 32, the rod 33 is enlarged and made square or of other cross section to correspond with that of the aperture 30, as at 37. Beyond the squared portion 37, the rod or shaft is round in cross section, as at 39, and of less diameter than the smallest diameter of aperture 30, so that the rod or shaft can be turned when the round portion 39 is within the aperture in the wall 29. In its opposite side walls, the member 25 is provided with alined apertures 34 and a similar aperture 35 is formed near the end of the rod and through its arms.

The receptacle 1 is secured to the bracket described, in the following manner: The ring 32 is clasped around the receptacle and seated in groove 22 and the arms of the rod 33 brought together. A spiral compression spring 36 is then placed over the cylindrical end of the rod. This is then introduced endwise into the bore 31, and through the aperture 28 in the wall 27. The rod is pushed in and the spring 36 compressed until the transverse aperture 35 through the rod 33 is opposite to the alined apertures 34 in the wall of the body 25. When in this position, the square portion 37 of the rod 33 is beyond the head 29 and within the circular bore 31 in the member 25, and round portion 39 is within the aperture in the wall 29. A suitable pin 38 is then passed through one of the apertures 34 and through the aperture 35 in the rod 33. This pin is preferably made of slightly less length than the internal diameter of bore 31 and of greater length than the diameter of the aperture 28. After the pin has been placed in position, the receptacle is turned to normal position, or until the square portion 37 of the rod 33 is alined with the square aperture 30 in the head 29. The spring 36 is then allowed to project the rod 33 endwise until the square portion 37 enters the aperture 30 and the pin 38 engages the back side of the wall 27. In this position of the parts, the receptacle is rigidly supported by the bracket and cannot be turned. Neither can it be easily removed from the bracket. Should it be desired to remove the receptacle, however, the operation just described is reversed and the rod 33 pushed in and turned until the pin 38 can be forced out endwise through one of the apertures 34 by any suitable tool.

After the pin 38 has been inserted into the shaft 33 through the apertures 34, these apertures may be closed or plugged in any suitable manner. This will prevent or make difficult the removal of pin 38 by unauthorized persons and is desirable under some circumstances.

Whenever it is desired to fill the receptacle, or to invert it for any other reason, it is grasped and the rod 33 pushed endwise until the square portion 37 is freed from engagement with the aperture 30 in the head 29. The receptacle can then be inverted or turned, the rod 33 acting as a pivot. By then unscrewing the collar 12 and removing the holding member 8 and cup 2, the receptacle may be filled through the discharge orifice 3.

The simple form of device described to this point is particularly adapted for manual operation and for dispensing measured quantities of liquids, such as liquid soap, toilet waters, etc., and will be supported by means of the bracket described in any position suitable for such use, as for example over a lavatory or wash basin. With simple modification, however, the device is equally well adapted for use for dispensing measured quantities of disinfectants or deodorants.

In Fig. 6 is illustrated a form of device suitable for use within an ordinary flushing tank 49. The receptacle 1 is supported in a bracket comprising a split ring 45 embracing the receptacle and fitting the groove 22 therein, and to which it is clamped by screws or bolts 46. Preferably, arms 47 are provided on the bracket which are suitably secured to the wall of the flushing tank, as by having their upper ends 48 bent to rest upon and be secured to the upper edge thereof. This form of device is the same as that just described with the exception of the cup $2^a$. This is formed in such manner as to be buoyant or capable of floating and being raised by the water within the flushing tank. It may be formed of any material of specific gravity less than water, as cork, wood, or other light material. Or, if desired, may be non-buoyant of itself and so formed as to permit the attachment of a suitable float thereto. Fig. 7 illustrates the latter construction. The cup $2^b$ is formed of glass, as in the other forms, and is provided at its lower end with a short rod 91 screwed, cemented or otherwise secured in an aperture in the body of the cup, and the lower end of which is suitably secured to a float 92, which may be of metal, rubber or other material as desired. In the form illustrated in Fig. 6, however, the cup $2^a$ itself is constructed of sheet metal, preferably copper or other non-corrosive metal, and is hollow and air tight and of such lightness as to float upon or in the water in the flushing tank. Its outer surface, however, corresponds to, and as a body, it is of the same shape as the cup 2 illustrated in Fig. 1. With this form of device, the cup 2ª is normally held in its upper position or in a position corresponding to that of cup 2 in Fig. 3. The apparatus is so secured within the flushing tank and positioned with reference to the water within the same when filled, that the cup 2ª, by reason of its buoyancy, is lifted by the water until the end of the neck 5 contacts with the bottom of the chamber or space 7. The liquid contained within the well 7 of the cup 2ª, however, forms a liquid seal for the orifice 3 and prevents discharge of liquid from the receptacle while the apparatus is in this position. At each flushing of the closet, the water within the tank 49 runs out, and as it does, the buoyant cup 2ª gradually lowers until its lugs 17 ride upon the shoulders 16 of the holder 8. During this downward movement of the well air enters the receptacle 1, and the well 7 within the cup 2ª is filled with liquid, which, in this case is understood to be either a disinfectant or deodorant, or both, as desired. After the flushing of the closet the tank is again automatically filled, and as the water rises the cup 2ª is lifted to its upper position, during which movement the neck 5 of the receptacle enters the well 7 in the cup and displaces a given quantity of the disinfectant or deodorant therefrom. This flows over the rim of the cup and down its sides, as before, and into the water in the flushing tank. During the interval between flushings plenty of time is afforded for permeation of the water within the flushing tank by the liquid thus discharged thereinto. The device described, when used in the manner stated, is simple and automatic in operation and delivers an exact, definite, and measured quantity of liquid into the flushing water at each operation.

Fig. 8 illustrates another application of the invention in which the appartus is contained within the flushing tank and is supported therein in substantially the same manner as the apparatus shown in Fig. 6, but in which it is operated positively and directly. In this embodiment of the invention the cup 2 may be formed in the same manner as that shown in Fig. 1, although this is not essential. 52 represents the discharge valve operating member, usually a lever fulcrumed at 53, and which is included in almost all flushing tanks for operating the discharge valve 54 by some suitable connection therebetween. In this form of the invention, a leg 55 is connected to one arm of the lever 52 and provided with a foot 56 located under the cup 2. The leg 55 may be formed as a separate part to be attached to an existing lever member 52 in a flushing tank already installed, or as an integral part of the member, as preferred. With this form of the apparatus the receptacle 1 is so disposed with reference to the water in the tank that when the latter is filled, the cup 2 is in its lowest position, as shown. At each operation of the lever 52 to discharge the water from the flushing tank the foot 56 raises the cup 2 and causes the discharge of a measured quantity of disinfectant or deodorant into the water rushing out from the flushing tank. This device differs from that shown in Fig. 5 in that between flushings the disinfectant does not permeate the water in the flushing tank.

Fig. 9 illustrates another application of the invention in which the apparatus is mounted upon any suitable form of bracket 60 outside of the flushing tank 65. Bracket 60 may be of the form of that shown in Fig. 1, and attached to the flushing tank itself or to any convenient wall or other fixed support. With this form of the invention means is provided for conveying or conducting the liquid discharged from the receptacle to the closet bowl or commode. This consists of a metallic cup 61, threaded at its upper portion, as at 62, for securement to threads 63 formed upon the exterior of the holder 8. A tube or conduit 64 is connected to the lower end of the cup 61, preferably by soldering or brazing, and leads to the closet bowl or commode. Suitable means is provided with this application of the invention for automatically operating the cup 2. Preferably, this is a double-armed lever operatively connected to the cup and controlled from the discharge valve operating mechanism of the tank. The lever may have its fulcrum secured to the flushing tank or other suitable fixed support or may be arranged as shown. In the embodiment illustrated in Fig. 9, the cup operating lever extends through an aperture 67 in the wall of the cup 61 and is bent, as at 68, to rise upon an edge of the cup to form a fulcrum for the lever. One arm 69 of the lever engages the cup 2. The other extends toward the flushing tank and is provided with a suitable connection to the discharge valve operating member 66 of the tank. With this form of the invention, at each operation of the flushing tank, the end 69 of the lever, raises the cup 2 and causes the displacement of a portion of the liquid from the well into the metallic cup 61, from which it flows through the conduit 64 into the closet bowl or commode. With this form of the invention, whenever desired to fill the receptacle, it is necessary to first slightly unscrew the collar 12. Then by grasping the holder 8 and unscrewing it from the screw thread of the cup 61, the latter can be separated from the dispensing apparatus. There is usually sufficient resiliency or spring in the cup 61 and conduit 64 to permit this movement. After separation of the cup 61 from the apparatus, the apparatus may be reversed and filled as before. Air is permitted to enter the receptacle either through the aperture 67 or through a special aperture 67ª in the wall of the cup 61.

With all forms of the invention described, various arrangements may be provided or utilized for varying the quantity of liquid dispensed at each operation of the apparatus. This obviously depends upon the size of the neck 5 of the bottle and the extent to which it dips into the space or chamber 7 at each operation. To a great measure it is also dependent upon the range of movement of the cup 2, or of the receptacle 1, as the case may be. Usually at each operation of the device, the neck 5 is caused to contact with the bottom of the space 7. Its movement is then limited in one direction by contact between the lugs 17 and shoulder 16, and in the other direction by contact between the neck 5 and the bottom of the cup 2. The range of movement may be varied, for example, by varying the number of the washers or shims 14. Fig. 1 shows two washers 14 in place. If the number of these washers is increased, the shoulder 16 of the holder 8 is moved downwardly away from the end of neck 5 and the possible range of movement of the cup is increased. If the number of washers is decreased, the range of movement of the cup is less, as will be readily understood. Another means of effecting the same result is by securing to or placing on the cup 2 a member which will contact with some portion of the receptacle 1 during relative movement of these parts. For example, in Fig. 6 the range of movement of the cup 2 is varied, by inserting in or removing from the well 7, disks or washers 70 which contact with the end of the neck 5. In Fig. 1, the same result is secured by suitably securing to the cup 2 an arm 71 formed of metal which may be bent or flexed to vary the position of its end, and which is arranged to contact with the end of the holder 8, attached to and forming part of the receptacle.

It is preferred, however, to provide adjustable means for varying the quantity of liquid displaced which is more positive in action than the forms described. In Fig. 3 the neck 5 is illustrated as formed on its exterior with screw threads 72. Adjustably mounted upon the exterior of the neck 5 is a threaded collar 73 provided with a flange 74 at its lower end, which forms a stop against which the cup 2 strikes at the end of its upward movement. The collar 73, if desired, may be formed of one or more washers placed around the neck of the receptacle, as shown in Fig. 7 and which are abutted by the upper portion of the cup at the end of its movement. It is preferred, however, to form the collar 73 of metal and thread it onto the neck, as stated, and as shown in Fig 3. When so arranged, the collar may be adjusted longitudinally of the neck 5. In case collar 73 is used, as described, it is preferred to form the upper end of each of the lugs 17 and ribs 18 with knobs or projections 75, the surfaces of which are inclined, as at 76, inwardly toward the space 7 and at their outer sides, as at 77, away therefrom. Although the ribs 18 contact with the inner wall 15 of the holder 8 to guide the cup during its movement, the inclined surfaces 75 assure concentric position of the cup 2 at the end of its stroke. As the well rises the flange 74 is engaged by the inclined surfaces 76 to guide the well to concentric position. The inclined surfaces 76 also cause the liquid flowing over the rim of the well to drain off quickly.

In the forms of cup described to this point, the liquid displaced from the cup flows over the upper edge of the rim thereof and down its sides. Other arrangements for securing a discharge may be used, however. Fig. 10 illustrates a construction in which the liquid displaced from the cup flows through ports in the body thereof. As illustrated, each of the ribs 18 is formed with a vertical passage 80 opening through the bottom of the cup and communicating at its upper end with a lateral port or passage 81. The ports 81 shown are formed by cutting away or removing the material from the upper edge of the cup and are really grooves in the upper surface thereof. In the form show, the liquid rising in the cup flows through the ports or the grooves 81 and down through the passage 80 to the lower end of the cup. If desired, the ports 80 may be omitted and the passages 81 be extended across the upper edge or entirely through the body of the cup from the inside to the outside thereof between the lugs. If so arranged, the liquid will flow through the passages 81 to the outside of the cup without wetting the upper surface thereof. It will, of course, be understood that either arrangement may be used alone, or both together, and that with both arrangements the parts are so adjusted in position that the level of the liquid seal is below that of the ports 80, when they are used.

If desired, means may be provided for varying the size of the discharge orifice 3, although this is not essential. Fig. 10 illustrates a perforated plug 85 formed of cork or other material and fitting the orifice 3. This is provided with a bore 86 of less diameter than that of the orifice 3. By placing within the orifice 3, plugs 85 having bores of different diameters, the size of the orifice 3 may be varied. Such variation is advisable under some circumstances where a particularly exact regulation is required. If the discharge orifice 3 is large, the bubble of air entering therethrough is of correspondingly large size, while if the orifice is small, the bubble is small. It may sometimes happen, that to fill the cup 2, several separate bubbles of air must enter receptacle 1 and separate quantities of liquid to be discharged therefrom. If these bubbles are large, exact regulation is not possible as when the orifice is small. It will also be observed that with a given construction, if a plug 85 is inserted into the orifice 3 of the receptacle, the size of the neck of the receptacle is varied. In other words, its volume is increased and it consequently displaces more liquid from the cup than before. This, therefore, provides an additional method of varying the quantity of liquid displaced from the cup.

Instead of using the members 85, or in addition thereto, other members in the form of annular rings 86 may be placed around the neck to vary the size thereof, as illustrated in Fig. 13. These may either be secured to the neck or merely placed in the cup. It will be observed that if the space between the outside of the neck 5 and the inner surface of the well 7 is comparatively wide, and the neck projects downwardly into the well so that the liquid seal is normally considerably below the upper surface of the cup, it is necessary to fill the cup by raising the level of liquid therein to the upper edge of the cup before any liquid will overflow therefrom. The volume or space within the cup normally unfilled with liquid must, therefore, be added to the volume of liquid which it is desired to displace from the cup to secure the volume of neck which must be introduced into the cup to displace that quantity of liquid. The volume or space within the cup unfilled is, therefore, a factor of the quantity of liquid discharged and if varied under given circumstances will vary the amount discharged. The members 86, when placed around the outside of the neck in the form of annular rings and as described, will decrease this unfilled space in addition to increasing the volume of the neck and, therefore, vary the amount of liquid displaced from the cup.

The device illustrated in Fig. 3 may also be used as an evaporating disinfecting apparatus. If the collar 73 is screwed down along the neck 5 until it engages the cup 2, it clamps this rigidly against the holder 8. With the device so arranged air enters the space within the holder 8 through the spaces 20 and absorbs a certain quantity of disinfectant or deodorant from that exposed to the air within the cup 2, as will be obvious. As the disinfectant or deodorant evaporates from the cup, the liquid seal lowers and air enters the receptacle 1, and the cup 2 is replenished from the receptacle 1.

With all forms of the apparatus, the construction is cleanly and sanitary. The receptacle 1, holder 8 and cup 2 may each be made of pressed or molded glass. These parts can be inexpensively formed in automatic machines in large quantities. If so formed, the device is readily cleaned or washed and is provided with smooth surfaces not liable to collect dirt. The apparatus, in all of its forms, is devoid of ground fits and the necessary expense incident to such construction. It has no valve in the true sense of the word and operates solely upon the principle of displacement. When used as a soap dispensing apparatus, and as shown in Fig. 1, it is impossible to get more liquid soap from the apparatus at a single operation than it is adjusted to discharge. The lower end of the cup 2 is engaged by the palm of the hand to raise it. When it has been moved to its upper position, the discharge of liquid from the receptacle 1 is prevented by three distinct seals: 1st, the liquid seal which always exists or is established irrespective of the position of the cup; 2nd, the seal formed between the end of the neck 5 and the washers in the bottom of the well 7; and 3rd, the seal formed between the palm of the hand and the rim of the holder 8.

What I claim is:

1. A liquid dispensing apparatus, comprising a receptacle having a neck formed with a discharge orifice, a holder secured to said receptacle, a cup of less diameter than said holder movably mounted therein and surrounding said neck, and means on said cup for spacing it from said holder to permit the discharge of liquid from said cup through the space between the cup and the holder.

2. A liquid dispensing apparatus, comprising a receptacle having a neck formed with a discharge orifice and provided with an annular flat surface, a holder having an annular flange fitting said surface, a screw threaded collar secured to said receptacle and engaging said flange for securing the holder to the receptacle, and a cup movably supported in said holder and surrounding said neck.

3. A liquid dispensing apparatus, comprising a receptacle having a neck formed with a discharge orifice, a holder adjustably secured thereto, a cup provided with spaced ribs and projections supported in said holder, said holder being formed for engagement by said projections and ribs to support said cup with its body spaced from said holder.

4. A liquid dispensing apparatus, comprising a receptacle having a neck formed with a discharge orifice, a cup surrounding said neck and into which the same dips, a holder surrounding said cup and arranged to support the same, and a stop adjustable on said neck toward and from said cup and arranged to be contacted by said cup for limiting movement thereof toward said receptacle.

5. A liquid dispensing apparatus, comprising a receptacle having a threaded neck formed with a discharge orifice, a threaded stop adjustable on said neck, a cup surrounding said neck and arranged to permit the formation of a liquid seal for said orifice, and a holder for supporting said cup, said cup having an inclined upper surface arranged to engage said stop and limit the movement of said cup toward said receptacle and also centralize the same with reference to said discharge orifice.

6. A liquid dispensing apparatus, comprising a receptacle having a neck formed with a discharge orifice and provided with an annular shoulder, a holder having an annular flange fitting said shoulder, a collar removably secured to said receptacle and engaging said flange for securing the holder to the receptacle, and a cup surrounding said neck and carried by said holder and movable therein and arranged to control the discharge of liquid from said discharge orifice.

In testimony whereof, I have hereunto set my hand.

EDWARD R. WILLIAMS.

Witnesses:
W. B. WHARTON,
ELBERT L. HYDE.